United States Patent [19]
Murata et al.

[11] Patent Number: 5,276,568
[45] Date of Patent: Jan. 4, 1994

[54] TRACKING CONTROL DEVICE IN A MAGNETIC REPRODUCING APPARATUS WITH OFFSETTING OF A LEVEL OF ONLY ONE OF TWO PILOT-SIGNAL DETECTION SIGNALS

[75] Inventors: Noriyasu Murata, Kokubunji; Susumu Takashima, Tachikawa both of Japan

[73] Assignee: Casio Computer Co., Ltd., Tokyo, Japan

[21] Appl. No.: 803,149

[22] Filed: Dec. 5, 1991

Related U.S. Application Data

[62] Division of Ser. No. 352,100, May 15, 1989, Pat. No. 5,089,918.

[30] Foreign Application Priority Data

May 18, 1988 [JP] Japan ................ 63-121284
May 19, 1988 [JP] Japan ................ 63-122779

[51] Int. Cl.[5] .................. G11B 21/04; G11B 15/14
[52] U.S. Cl. ............................. 360/70; 360/64
[58] Field of Search ................. 360/10.2, 8, 64, 70

[56] References Cited

U.S. PATENT DOCUMENTS

| | | | |
|---|---|---|---|
| 4,438,465 | 3/1984 | Moriya et al. | 360/22 |
| 4,523,237 | 6/1985 | Fukuda et al. | 360/8 |
| 4,568,986 | 2/1986 | Furuhata et al. | 360/10.2 |
| 4,760,474 | 7/1988 | Takimoto | 360/64 |
| 4,760,474 | 7/1988 | Takimoto | 360/64 |
| 4,905,104 | 2/1990 | Okamoto et al. | 360/64 |
| 4,951,162 | 8/1990 | Yoshimura et al. | 360/18 |

FOREIGN PATENT DOCUMENTS 49-106306 10/1974 Japan .
53-27015 3/1978 Japan .

Primary Examiner—Aritotelis Psitos
Assistant Examiner—Won Tae C. Kim
Attorney, Agent, or Firm—Frishauf, Holtz, Goodman & Woodward

[57] ABSTRACT

A tracking control device comprises a tape driving device for driving a magnetic tap at a predetermined running speed; and a rotary head carrying a magnetic head, for rotating the magnetic head to trace a plurality of record tracks on a magnetic tape driven by the tape driving device, the magnetic head having two gaps which have different azimuth angles from each other, the respective gaps being adapted to be used to trace every other record track. A signal reproducing circuit is connected to the magnetic head, for reproducing as signal supplied from the magnetic head; and a pilot signal detector is connected to the signal reproducing circuit for detecting pilot signals included in the signal reproduced by the signal reproducing circuit, the pilot signals being recorded in record tracks on both sides of the record track which is traced by one of the gaps of the magnetic head, and for outputting pilot-signal detection signals each representing levels of the detected pilot signals. A level of only one of the pilot-signal detection signals is offset by a predetermined value; and the tape running speed of the magnetic tape is adjusted by controlling the tape driving device such that the offset level of one of the pilot-signal detection signals will coincide with the level of the other of the pilot-signal detection signals, whereby said magnetic head of the rotary head means is allowed to trace the record tracks at a tracing angle which is different by a certain angle from the predetermined lead angle of the record tracks.

6 Claims, 11 Drawing Sheets

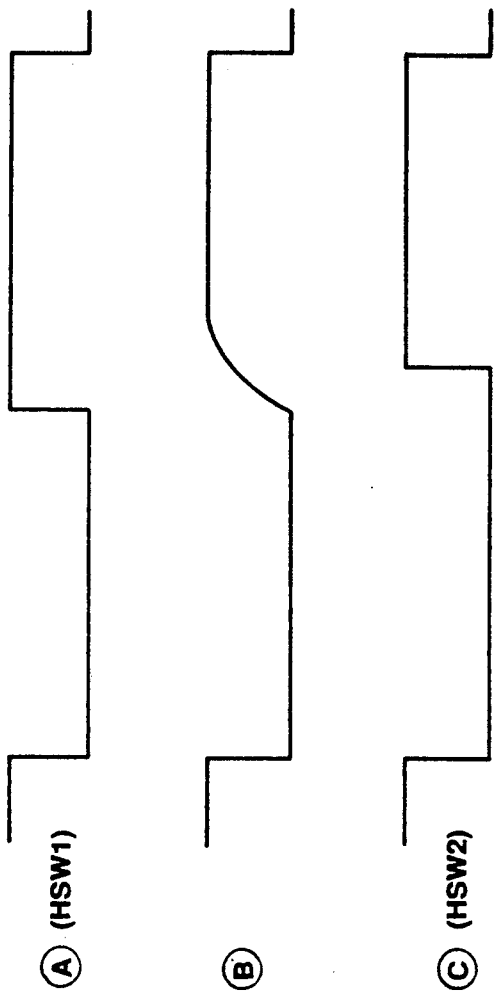
FIG.9A  Ⓐ (HSW1)
FIG.9B  Ⓑ
FIG.9C  Ⓒ (HSW2)

FIG.10A HSW 1
FIG.10B HSW 2
FIG.10C
FIG.10D
FIG.10E
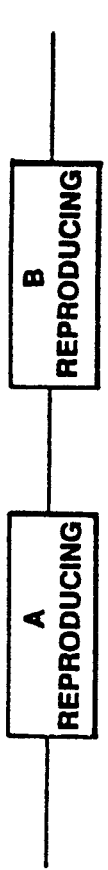
FIG.10F

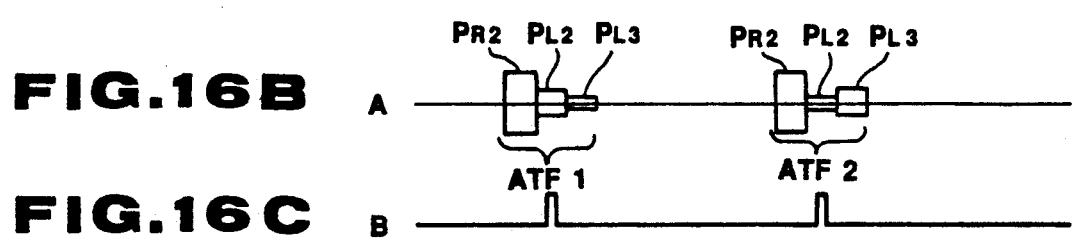

TRACKING CONTROL DEVICE IN A MAGNETIC REPRODUCING APPARATUS WITH OFFSETTING OF A LEVEL OF ONLY ONE OF TWO PILOT-SIGNAL DETECTION SIGNALS

This application is a division of Ser. No. 07/352,100 filed May 15, 1989 now Pat. No. 5,089,918.

BACKGROUND OF THE INVENTION

The present invention relates to a magnetic recording and/or reproducing apparatus which employs a one-head drum including a single head with double gaps each having a different azimuth angle.

In conventional magnetic recording and/or reproducing apparatus, for example, such as digital audio tape recorders (hereinafter, referred to as "DAT") of a rotary head type, a two-head drum is mostly used. In magnetic recording and/or reproducing apparatus of the two-head drum type, a plurality of heads are installed on the rotary drum, so that various work of adjustment, such as pairing adjustment of heads, height-adjustment of heads and adjustment for relevant mechanisms is required, resulting in a raise in production costs of the rotary drum and a decrease in the productivity of manufacturing of rotary drums.

An employment of one-head drum including one head with two gaps of different azimuth angles (hereinafter, simply referred to as "double azimuth one-head drum") in place of two-head drum simply for the purpose of cost down and an increase in the productivity encounters with a difficulty in decreasing manufacturing costs, because drums having a specified lead angle (track angle) have to be prepared.

In the meantime, since the international standard for DAT has been settled, a decrease simply in number of heads can not satisfy the above standard, leaving an inconvenience of incompatibility.

Summary of the Invention

It is an object of the present invention to provide a magnetic recording and/or reproducing apparatus which employs a double azimuth one-head drum, satisfying the above international DAT standard and thereby allows to decrease manufacturing costs of drums and to increase the productivity of manufacture thereof and in addition which has almost the same performance as that of the apparatus having a two-head drum.

It is another object of the present invention to provide a tracking control circuit used in an apparatus which employs the double azimuth one-head drum and serves to record recordings in accordance with the standard format and said tracking control circuit allows to firmly reproduce the recordings from the magnetic tape guided by a conventional drum, without changing the lead angle of the drum.

According to the present invention, a tracking control device is provided for use in a magnetic reproducing apparatus wherein a plurality of record tracks including respective pilot signals formed on a magnetic tape at a predetermined lead angle to a tape longitudinal direction are traced by a magnetic head for reproducing a signal. The tracking control device comprises tape driving means for driving the magnetic tape at a predetermined running speed; and rotary head means carrying the magnetic head, for rotating the magnetic head to trace the plurality of record tracks on the magnetic tape driven by the tape driving means, the magnetic head including two gaps having different azimuth angles from each other and the respective gaps to the magnetic head, for reproducing a signal supplied from the magnetic head; and a pilot signal detecting means is coupled to the signal reproducing circuit means for detecting pilot signals included in the signal reproduced by the signal reproducing circuit means, the pilot signals being recorded in record tacks on both sides of the record track which is traced by one of the gaps of the magnetic head, and for outputting pilot-signal detection signal each representing levels of the detected pilot signals.

Offset means is provided for offsetting a level of only one of the pilot-signal detection signals output from the pilot signal detecting means by a predetermined value; and tape speed control means is provided for controlling the tape driving means to adjust the tape running speed of the magnetic tape such that the the offset level of one of the pilot-signal detection signals will coincide with the level of the other of the pilot-signal detection signals, whereby the magnetic head f the rotary head means is allowed to trace the record tracks at a tracing angle which is different by a certain angle from the predetermined lead angle of the record tracks.

In the magnetic recording and/or reproducing apparatus of a rotary head type according to the present invention, a head including two gaps each having a different azimuth angle (hereinafter, referred to as "double azimuth head") is installed on the rotary drum and a switching signal having a polarity inverted every rotation of the above rotary drum is generated and the duty of the switching signal is adjusted so as to correspond to a time difference between the two gaps of the above head and thereby timings of recording operation and a reproducing operation executed by the above head is controlled on the basis of the adjusted switching signal.

The adjustment of the duty of the switching signal permits to perform recording and/or reproducing operations from a correct position on each recording track even though the double azimuth head is used.

Another feature of the present invention is in that a double azimuth head or a head having two gaps of different azimuth angles is installed on the rotary drum and this rotary drum is driven to rotate at a rotational speed two times the conventional rate and a lead angle (track angle) of the magnetic tape and the magnetic head is set at a predetermined large value in a tape-still mode so that the lead angle coincides with a standard value in a tape-running mode.

As in DAT mentioned above, the lead angle of the magnetic tape and the magnetic head is previously set at a large value in the tape-still mode, so that the lead angle and a track length on the magnetic tape can be made to coincide with the standard values, respectively in the tape running mode.

As mentioned above, that is, when a recording track is traced, the pilot signals of the following and previous tracks adjacent to the above recording track are detected and one of the pilot signals is offset or phase shifted by a certain value to compare the levels thereof and a tracking error signal is output by the comparison of levels whereby the magnetic head can be driven to trace precisely recording tracks, maintaining a certain relationship with the recording tracks and thus the recordings can be firmly reproduced.

Advantages of the Invention

According to the present invention, since the double azimuth one-head drum is employed, processes of the pairing adjustment and the height adjustment can be excluded, which processes incur most of the costs required for manufacturing the drum. Hence the manufacturing costs of drums can be sharply decreased and time-consuming mechanical adjustments can be also reduced. Since the duty of the switching signal is adjusted to compensate a time difference between one gap and the other gap of the head, the recording/reproducing operations can be performed so as to satisfy the standard format.

Furthermore, in the reproducing apparatus employing a double azimuth one-head drum, addition of a circuit to the tracking control circuit, which circuit provides offsets in accordance with a leading angle and a trailing angle of tracing of magnetic head, allows the magnetic head to trace the recording tracks under a certain condition and thereby the recordings recorded on a magnetic tape in a standard format can be reproduced without any defect. Since the addition of a simple circuit as described above removes a requirement for changing the lead angle of the rotary drum, the conventional drum, as it is, can be used and therefore a decrease in manufacturing costs as well as an increase in the productivity of manufacturing drums can be expected.

BRIEF DESCRIPTION OF THE DRAWINGS

FIGS. 1 through 11 are views illustrating a preferred embodiment of the present invention, in which:

FIG. 1 is a view illustrating a rough construction of a mechanical system;

FIG. 2 is a view illustrating a lapping angle at which a magnetic tape is lapped around a head drum;

FIG. 4 is a view schematically illustrating track patterns formed on the magnetic tape;

FIG. 5 is a view for describing a tape format;

FIG. 6 is a view illustrating a lead angle of the magnetic head to the magnetic tape;

FIG. 7 is a block diagram of a whole construction of a system of the embodiment of the invention;

FIG. 8 is a circuit diagram illustrating a duty-adjustment circuit;

FIGS. 9A to 9C are views illustrating signal waveforms effective for describing an operation of the duty-adjustment circuit;

FIGS. 10A through 10F are views for describing timings of recording/reproducing operations;

FIGS. 12 through 16 are views illustrating another embodiment of the present invention, in which:

FIG. 12 is a block diagram illustrating a construction of a reproducing system;

FIG. 13 is a view illustrating a lapping angle at which the magnetic tape is wounded around the head drum;

FIG. 14 is a block diagram illustrating details of the tracking control circuit;

FIG. 15 is a view illustrating a relationship between the recording tracks on the magnetic tape and the tracing of the magnetic head; and FIGS. 16A through 16G are timing-charts effective for describing the operation of the tracking control circuit.

DETAILED DESCRIPTION OF THE PREFERRED EMBODIMENTS

Figure 1:
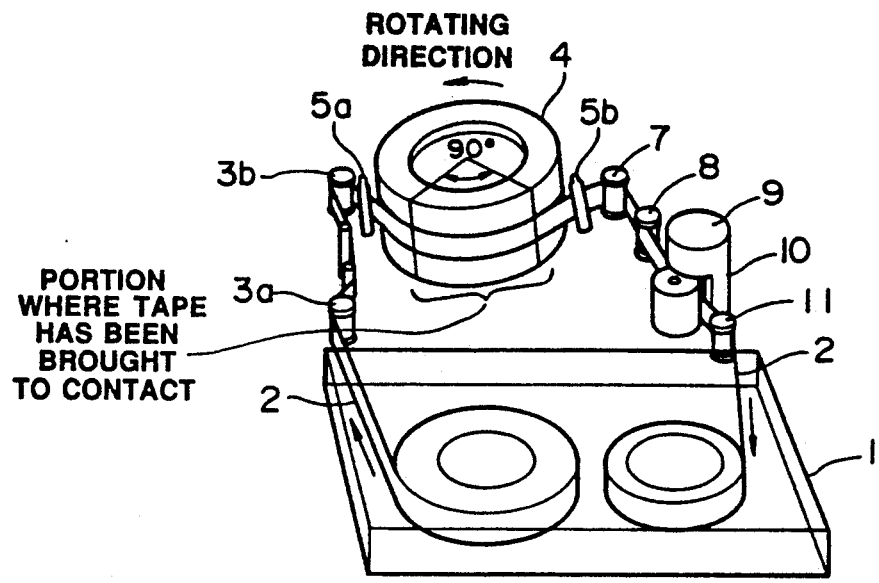
Figure 2:
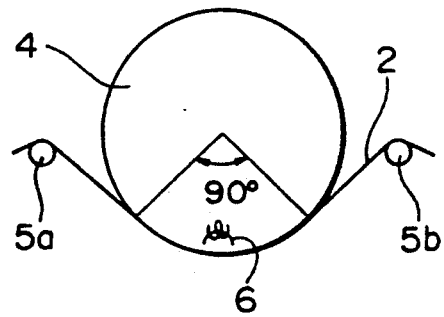

An embodiment of the present invention which is applied to a DAT will be described in detail referring to the accompanying drawings. A construction of mechanical part of the embodiment will be briefly described referring to FIG. 1. In FIG. 1, a numeral 1 stands for a tape cassette for DAT, which cassette is installed in an apparatus. When the cassette 1 is installed in the magnetic recording and/or reproducing apparatus, the magnetic tape 2 is pulled out from the cassette 1 towards a rotary drum 4, guided by guide rollers 3a and 3b. In the vicinity of the rotary drum 4, there are provided slant pins 5a and 5b as shown in FIGS. 1 and 2. The magnetic tape 2 is diagonally wound around the peripheral surface of the rotary drum 4 at a lapping angle of, for example, 90 deg. One double azimuth head 6 is provided on the above rotary drum 4, details of which will be described later. Since one double azimuth head 6 is provided on the rotary drum 4 as described above, the rotational speed Fv of the rotary drum 4 is set at a rate, 4000 rpm, two times that, 2000 rpm, of a two-head drum. After having passed the rotary drum 4 in contact therewith, the magnetic tape 2 is further guided through guide rollers 7 and 8 and directed between a capstan 9 and a pinch roller 10. The magnetic tape 2 is driven at a constant speed by the capstan 9 and pinch roller 10 and returns into the cassette 1 through a guide roller 11.

Figure 3A:
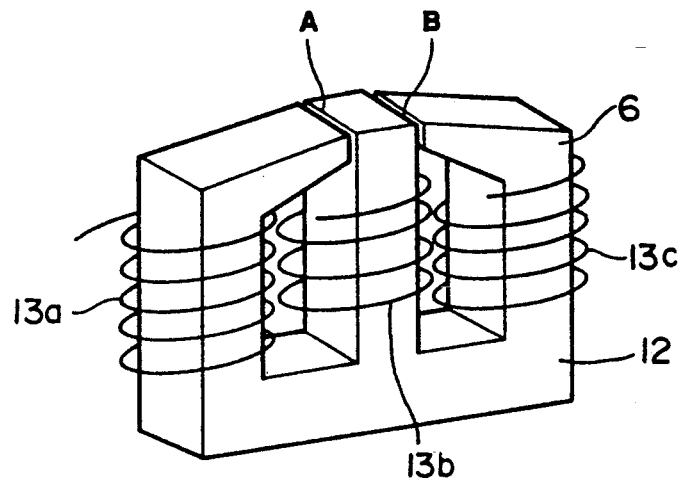
FIG. 3A is a perspective view of a magnetic head.
Figure 3B:
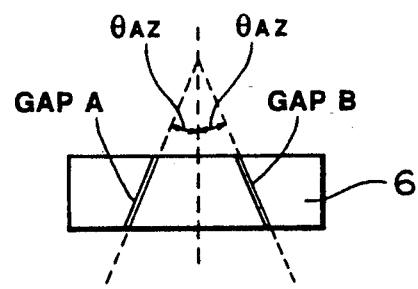
FIG. 3B is a front view of the magnetic head.

The double azimuth head 6 provided on the above rotary drum 4 has an E-shaped core 12 as shown in FIG. 3A, on which core coils 13a to 13c are wound and gaps A and B are formed in a front surface of the magnetic head 6. As shown in FIG. 3B, the gaps A and B are formed with an azimuth angle specified by the specification, e.g., with the azimuth angle $\theta$ AZ of $\pm 20$ deg. to a center line.

Figure 4:
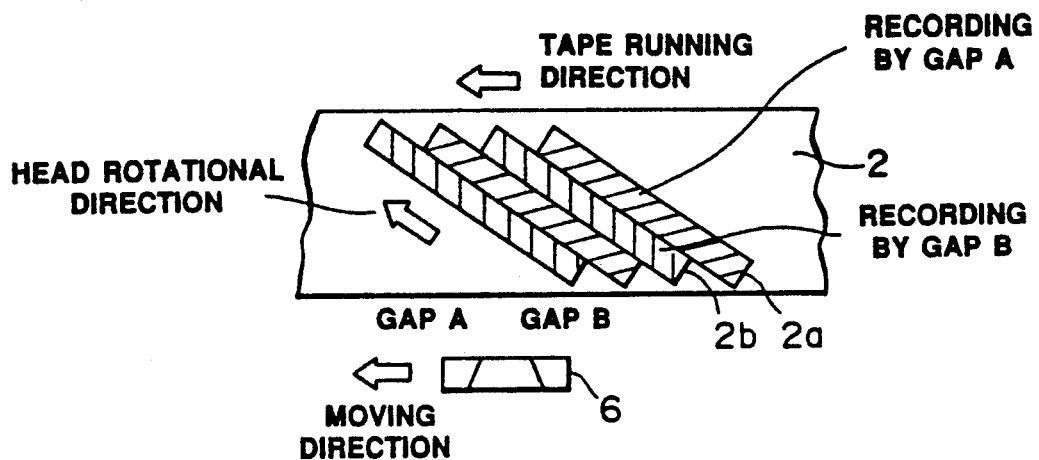

With use of the above double azimuth head 6, a recording track 2a formed by gap A and a recording track 2b formed by gap B are alternatively arranged on the magnetic tape 2 by alternatively switching gaps A and B, as shown in FIG. 4. The recording tracks 2a and 2b are different in azimuth direction to each other and therefore cross talk between the recording tracks 2a and 2b is minimized.

In case that the double azimuth head 6 is installed on the rotary drum 4, the rotational speed Fv of the rotary drum 4 is required to be set at a rate two times that of the two-head drum. In this case, if the lead angle in the tape-stop mode is set to the same value as the conventional value, the actual track length becomes longer than that specified in the DAT-Format standard.

Figure 5:
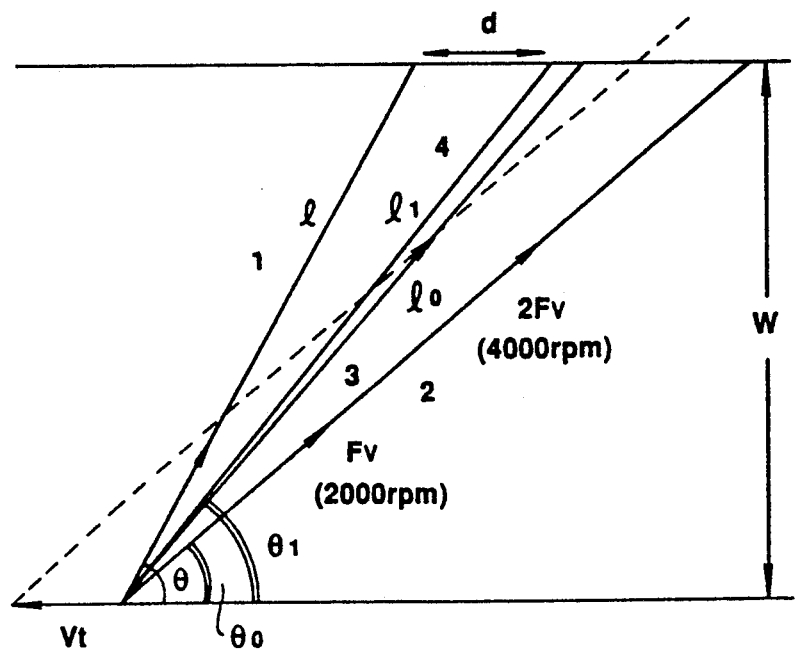

Hereinafter, the relationship between the lead angle and the track length in the tape running mode as well as in the tape stop mode will be described referring to FIG. 5. The lead angles shown in FIG. 5 are given where the conventional rotary drum 4 having a diameter $\phi$, 30 mm is used. A symbol ① in FIG. 5 indicates a track to be formed by a magnetic head in the tape running mode in accordance with the DAT format and the lead angle $\theta$ of the track ① is 6°22′59.2″. A symbol ② indicates a track formed by the magnetic head in the tape stop mode in accordance with the DAT format, and the lead angle $\theta_{of}$ of the track ② is 6°22′. In FIG.

Figure 6:
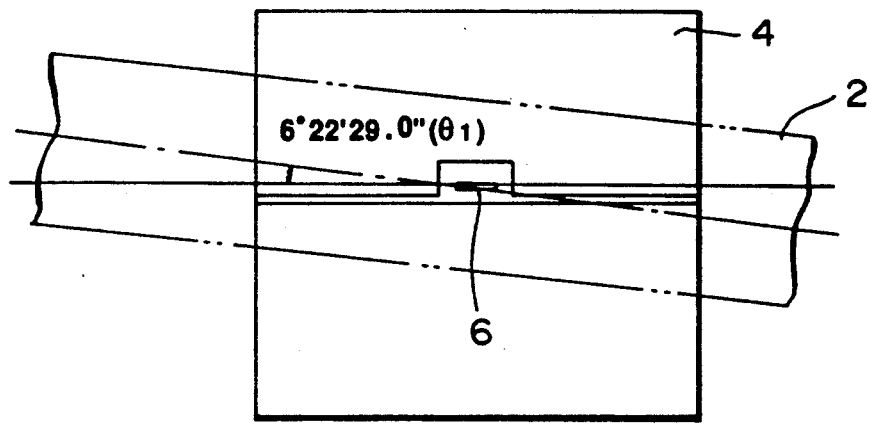

5, Fv stands for the rotational speed, 2000 rpm, of the rotary drum 4 and Vt stands for a relative speed of the magnetic tape 2 to the magnetic head 6. When the lead angle of the track in the tape stop mode is set to the same value 6°22' as specified in the DAT format and under this state, the rotary drum 4 is driven at the rate, 4000 rpm, two times that of the two-head drum, the traces of the magnetic head in the tape running mode will be formed at an angle less than that of the track ①, as shown by a symbol ③ in FIG. 5 and the track length $l_{of}$ will become longer than the length l specified in the format specification. The results mentioned above will be clearly understood from the vector sum of the vector quantities indicated by arrows in FIG. 5, i.e., the vector sum of the revolution numbers Fv of the rotary drum 4 and the relative speed Vt of the magnetic tape. For this reason, in the present embodiment, the lead angle $\theta$ of the track in the tape stop mode is set at the value 6°22'29.0" which is larger than the lead angle $\theta_{of}$ of the track ②, as shown at ④ in FIG. 5 and in FIG. 6, so that the track angle and the track length in the tape running mode may coincide with those specified in the format specification.

The format specification for DAT will be described referring to FIG. 5. The format specification for DAT specifies as follows:

| | |
|---|---|
| Effective track width W: | 2.613 mm |
| Tape speed Vt: | 8.150 mm/sec. |
| Track length l: | 23.501 mm |
| (in the tape running mode) | |
| Lead angle $\theta_0$, $\theta$ | |
| in the tape still mode $\theta_0$: | 6°.22' |
| in the tape running mode $\theta$: | 6°22'59.5" |

In the present embodiment, so as to satisfy the above specification with a one-head drum, the tape format is set as follows:

| | |
|---|---|
| Track length $l_1$: | 23.534 mm |
| (in the tape still mode) | |
| Lead angle $\theta_1$: | 6°29'29.0" |
| (in the tape still mode) | |
| Rotational speed of drum Fv: | 4000 rpm. |

In FIG. 5, a symbol d represents a distance for which the magnetic tape travels while the head is in contact with the magnetic tape.

Accordingly, the relationship between the lead angles $\theta$ and $\theta_1$ and also the relationship between the track lengths l and $l_1$ can be obtained from the following expressions.

That is, from FIG. 5

$$l = \frac{W}{\sin\theta}$$

$$l_1 = \frac{W}{\sin\theta_1} = \frac{\pi\phi}{N}$$

$$l^2 = d^2 + l_1^2 - 2 \cdot d \cdot l_1 \cdot \cos\theta_1$$

$$= \left(\frac{Vt}{Fv} \cdot \frac{1}{N}\right)^2 + \left(\frac{\pi\phi}{N}\right)^2 - 2 \cdot \frac{Vt}{Fv} \cdot \frac{1}{N} \cdot \sqrt{\left(\frac{\pi\phi}{N}\right)^2 - W^2}$$

-continued $$= \left(\frac{W}{\sin\theta}\right)^2$$

In the above expressions, a symbol W denotes a width of the magnetic tape 2, a symbol $\phi$ denotes a diameter of the rotary drum 4 and N is a variable.

The variable N which is reverse proportional to the lapping angle is obtained from the above expression. The following expression $$\frac{1}{N^2} = \frac{Z^2L^2 + S^2L^2 - 2S^2W \pm \sqrt{(Z^2L^2 + S^2L^2 - 2S^2W^2)^2 - (S^2 - Z^2)^2L^4}}{(S^2 - Z^2)^2}$$

is obtained from the formula of the solution, where $Vt/Fv=S$, $W/\sin\theta=L$ and $\pi\cdot\phi=z$. From this expression, the variable N is obtained and the lead angle $\theta_1$ (6°29'29.0") and the track length $l_1$ (23.534 mm) in the tape still mode can be determined, respectively.

Figure 7:
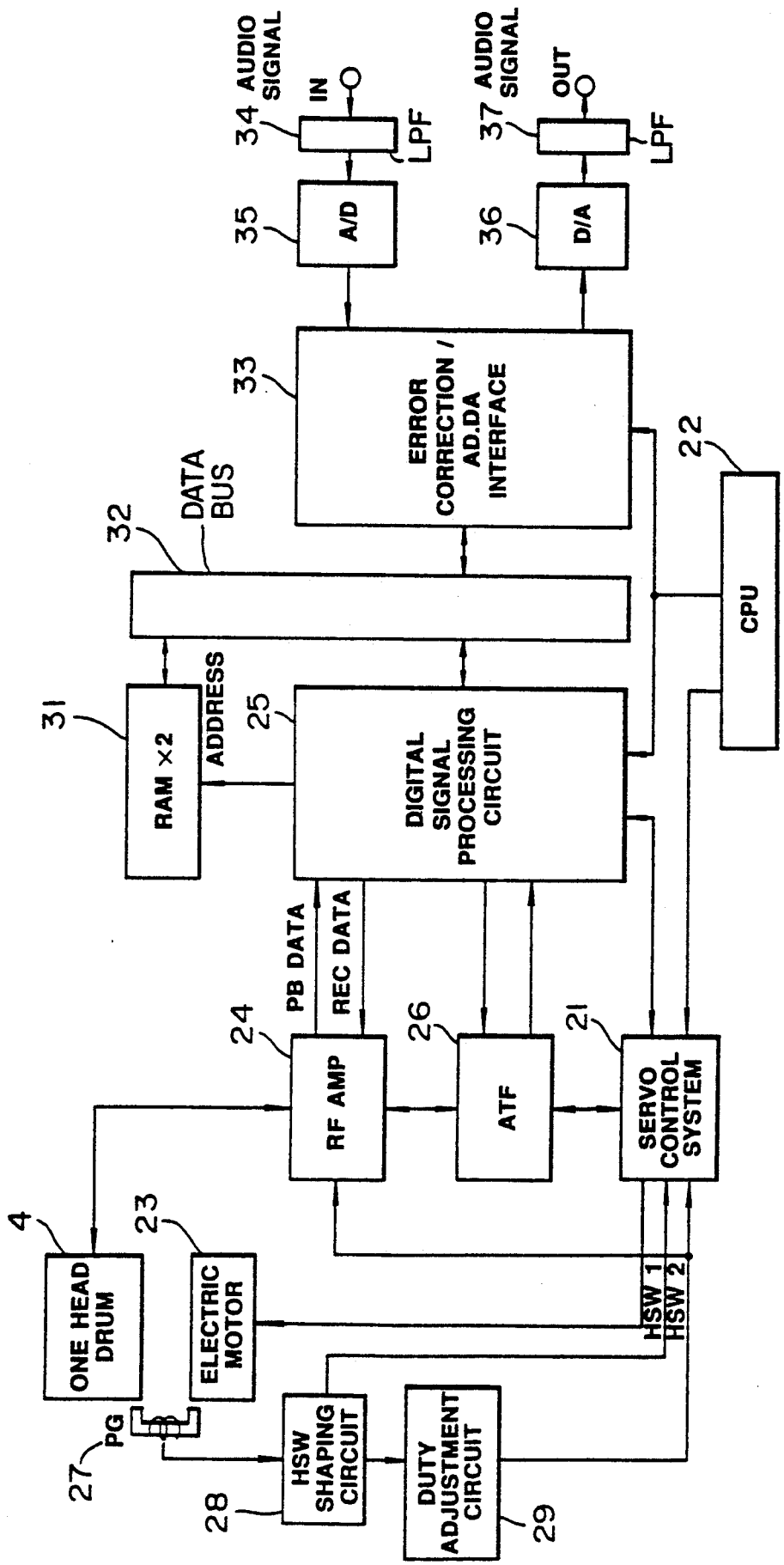

A system construction for controlling the above magnetic recording and/or reproducing mechanism will be described. FIG. 7 is a block diagram showing a whole system of the embodiment. In FIG. 7, a numeral 21 denotes a servo-control circuit, which controls an electric motor 23 on the basis of an instruction of CPU 22, so as to rotate the rotary drum 4 at 4000 rpm. A recording and reproducing head mounted on the rotary drum 4 is connected to an RF amplifier 24 through a rotary transformer. The RF amplifier 24 supplies data reproduced by the magnetic head to a digital-signal processing circuit 25, and also inputs data supplied from the digital-signal processing circuit 25 to the magnetic head. The RF amplifier 24 outputs a part of the signal reproduced by the magnetic head to an automatic tracking control circuit (ATF) 26. The ATF circuit 26 receives an operation timing signal from the digital-signal processing circuit 25. The ATF circuit 26 samples the reproduced signal on the basis of the operation timing signal supplied from the digital-signal processing circuit 25, and discriminates whether or not the magnetic head traces precisely on the recording tracks and outputs a correction signal to the servo-control circuit 21 in accordance with the result of the discrimination.

In the vicinity of the rotary drum 4, there is provided a PG-sensor 27. The PG-sensor 27 generates one pulse every time the rotary drum 4 rotates one revolution and the pulse signal is supplied to a switching signal (HSW) shaping circuit 28. The HSW shaping circuit 28 generates a switching signal HSW1 which goes alternatively high and low every time the HSW shaping circuit 28 receives the pulse signal from the PG sensor 27. The switching signal HSW1 is delivered to the servo-control circuit 21 and a duty-adjustment circuit 29. The duty-adjustment circuit 29, as will be described later, serves to modulate the switching signal HSW1 in response to the time difference between the gaps A and B of the double azimuth head 6. The modulated switching signal HSW2 is delivered to the servo-control circuit 21 and the RF amplifier 24. The servo-control circuit 21 outputs the above switching signal HSW1 to the ATF circuit 26 and the switching signal HSW2 to the digital-signal processing circuit 25. The digital-signal processing circuit 25 and the RF amplifier 24 decide timings of reading/writing operation on the basis of the above switching signal HSW2.

The digital-signal processing circuit 25 is connected to CPU 22, RAM 31 and data bus 32, to which data bus 32, RAM 31 and an error correction/AD·DA interface 33 are connected. The error correction/AD·DA interface 33 receives through a low pass filter 34 and an A/D converter circuit 35 an audio signal to be recorded on the magnetic tape. The error correction/AD·DA interface 33 outputs through a D/A converter circuit 36 and a low pass filter 37 a reproduced data.

Figure 8:
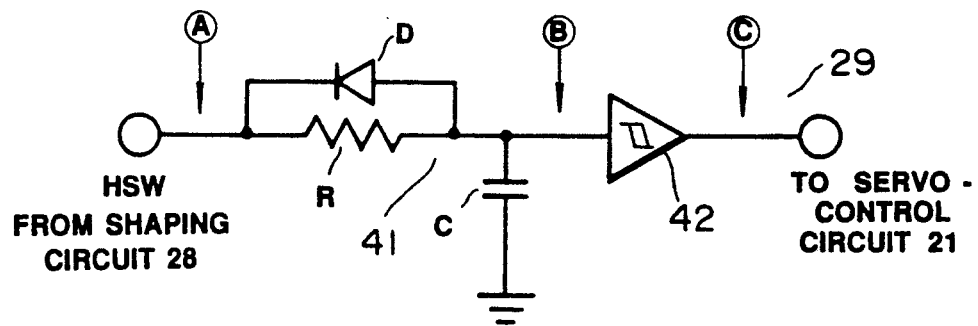

The above adjustment circuit will be described in detail referring to FIG. 8. The duty adjustment circuit 29 comprises a low pass filter 41 and a schmitt trigger circuit 42. The low pass filter 41 consists of, for example, a capacitor C and a resistance R to which a diode D is connected in parallel. The diode D is connected in the reverse polarity direction with respect to the signal source.

In the above circuit construction, when the switching signal HSW1 shown in FIG. 9A is delivered from the HSW signal shaping circuit 28 to the low pass filter 41, the diode D is turned on at the negative going edge of the signal HSW1 and the low pass filter 41 shows its no function. Therefore, at the negative going edge of the switching signal HSW1, the switching signal HSW1, as it is, passes through the low pass filter 41 without being delayed as shown in FIG. 9C. At the positive going edge of the switching signal HSW1, however, the diode D is turned off so that the low pass filter 41 shows its function. Therefore, high frequency components of the switching signal HSW1 are minimized at the low pass filter 41, so that the output signal of the low pass filter becomes an integrated waveform as shown in FIG. 9B. The output signal of the low pass filter 41 is shaped in its waveform as shown in FIG. 9C. Accordingly, the switching signal HSW2 outputted from the schmitt trigger circuit 42 has its positive going rear edges which are delayed for a predetermined time. This delay time is set at a value which coincides with a time difference corresponding to a distance between the gaps A and B of the double azimuth head 6, or which coincides with a time duration which is required for the gap B of the magnetic head to rotate to reach the position of the gap A, and in the present invention, the delay time is set at 63 μsec.

FIGS. 10A through 10F are views showing timings of the switching signals HSW and recording/reproducing operations to be executed by the magnetic head. In conventional apparatus, the head A and the head B are alternatively switched in accordance with the switching signal HSW1 as shown at ①  in FIG. 10C and at ④ in FIG. 10F to execute recording and/or reproducing operations. While, in the present embodiment, to execute recording and/or reproducing operations, the gaps A and B of the double azimuth head 6 are alternatively switched by the switching signal HSW2 as shown at ② in FIG. 10D and at ③ in FIG. 10E. In this case, the switching signal HSW2 is modulated such that the timing when the signal HSW2 goes high is delayed for a predetermined time so as to coincide with the timing when the recording track is to be formed on the magnetic tape.

Figure 11A:
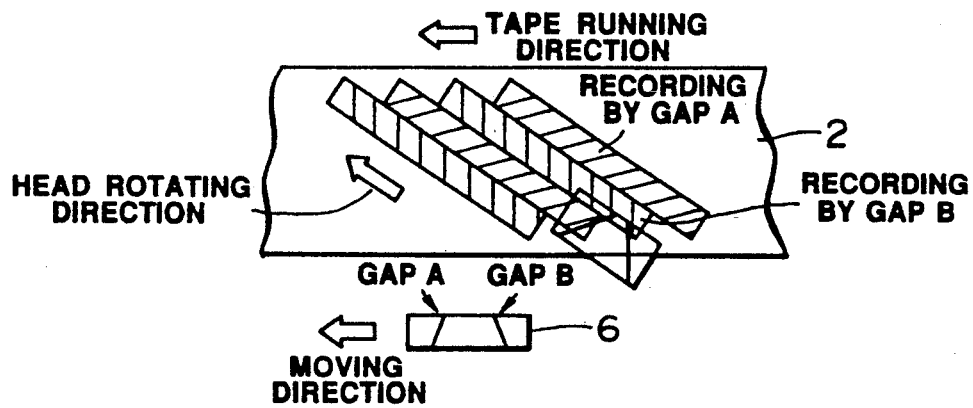
FIGS. 11A to 11C are views illustrating relationships between the track patterns and the head position for starting recording/reproducing operation.
Figure 11B:
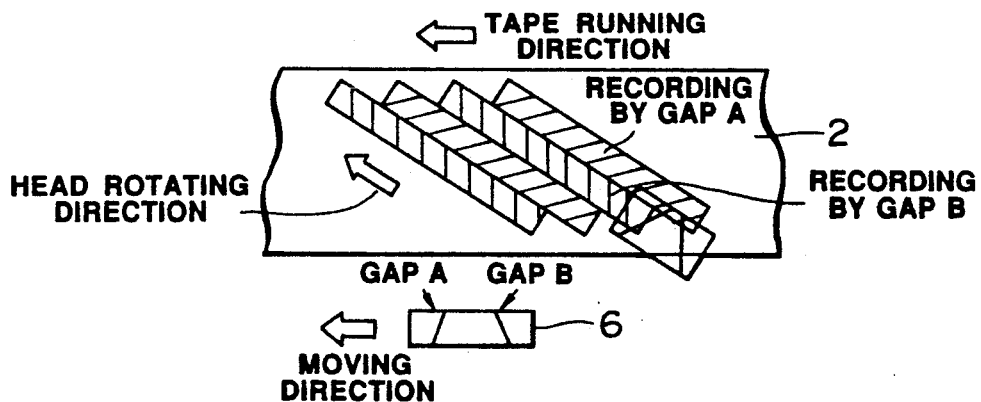
Figure 11C:
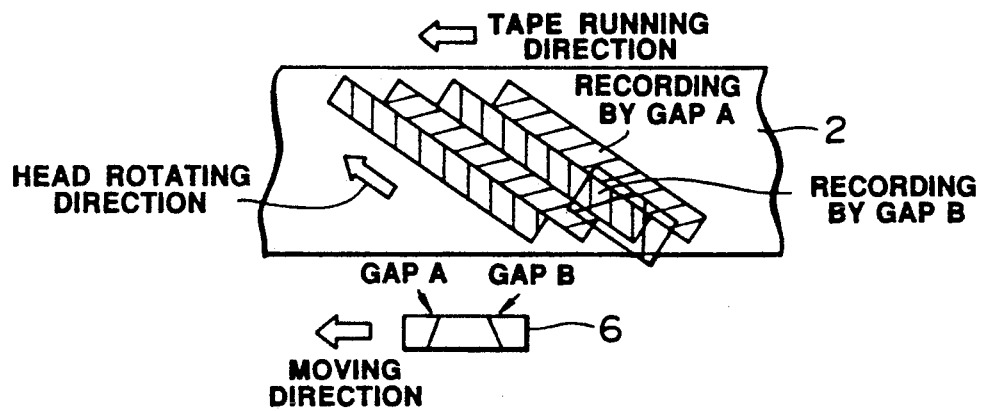

That is, as shown in FIG. 11A, the recording operation by the gap A of the magnetic head 6 is started at the position Ⓐ so as to satisfy the DAT format but if the switching signal HSW1 is used, the recording operation to be executed by the gap B will be started before the gap B has reached the normal position to satisfy the DAT format, as shown in FIG. 11B. As a result, the track patterns which satisfy the DAT format are not obtained. If the switching signal HSW2 is used, the duty of which is adjusted, however the timing when the gap B starts its recording operation can be delayed so as to shift the gap to the normal position as shown in FIG. 11C, and thereby the track patterns which satisfy the DAT format can be obtained. In the reproducing mode, as in the recording mode, the switching signal HSW2 allows the gaps A and B to start the reproducing operation from their normal positions.

As described above, even with use of the double azimuth one-head drum, the recording and reproducing operations can be performed, which are in conformity with the DAT format. Therefore, the apparatus having the above double azimuth one-head drum is warranted to be compatible with those using a two-head drum.

In the above embodiment, the invention which is applied to DAT has been described, but it will be easily understood that the present invention can be applied to video tape recorders in the same manner as in DAT.

Now, the second embodiment of the present invention will be described.

Figure 12:
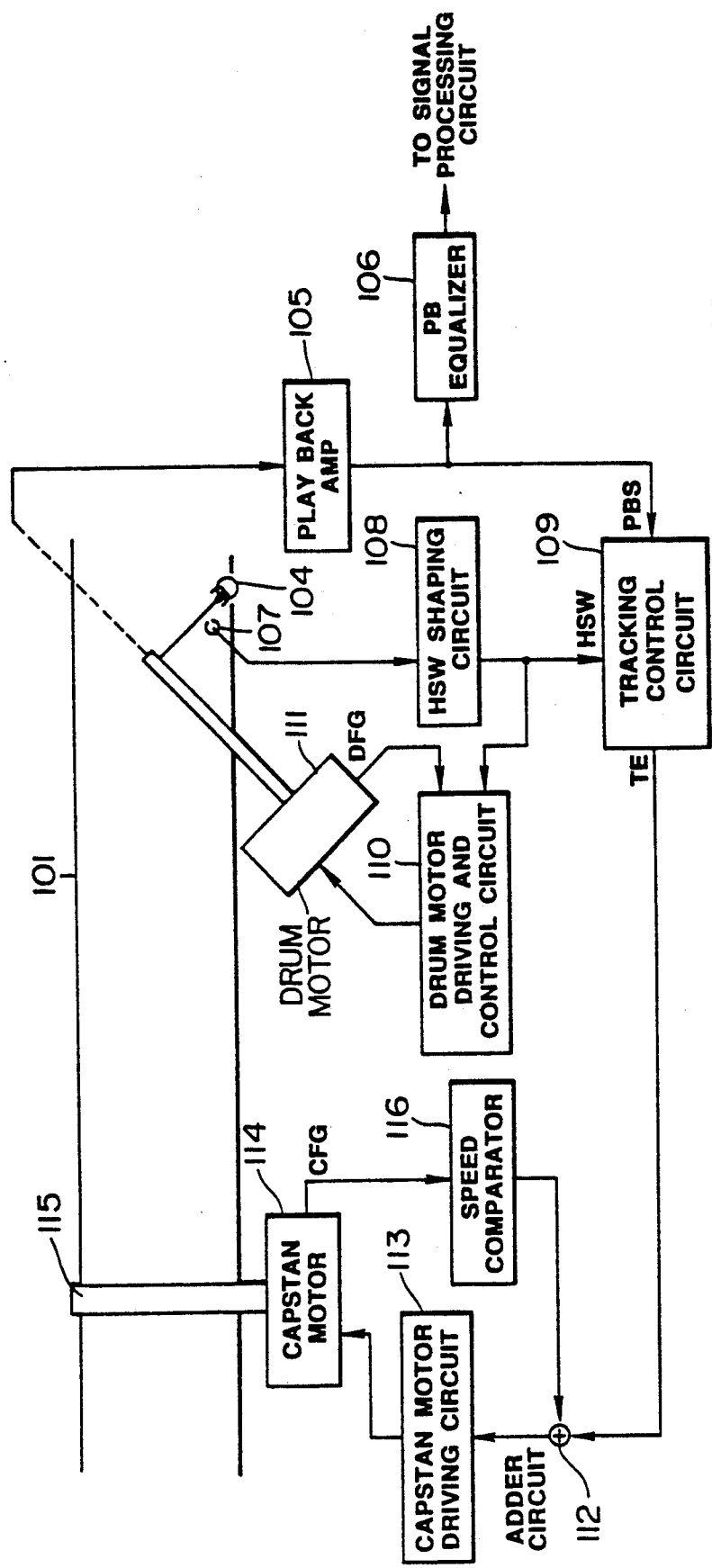
Figure 13:
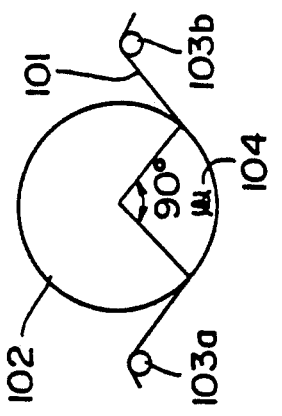

FIG. 12 is a block diagram showing a construction of a reproducing system of the embodiment. In FIG. 12, a numeral 101 stands for a magnetic tape which has been recorded in accordance with a DAT format. As shown in FIG. 13, magnetic tape 101 is diagonally wound around the rotary drum 102. That is, in the vicinity of the rotary drum 102, there are provided slant pins 103a and 103b, and with aid of these slant pins 103a and 103b, the magnetic tape 101 is diagonally wound around the peripheral surface of the rotary drum 102 at a lapping angle of, for example, 90 deg. At the peripheral surface of the rotary drum, there is provided one double azimuth head 104, which serves to reproduce the recorded signal from the magnetic tape 101. The reproduced signal is supplied to a signal processing circuit (not shown) through a reproducing amplifier 105 and a reproducing equalizer circuit 106. There is also provided a PG head 107 for detecting phase in the vicinity of the rotary drum 102. The output signal of the PG head 107 is shaped in waveform by a switching signal (HSW) shaping circuit 108 and is supplied as the switching signal HSW to a tracking control circuit 109 and a drum-motor driving/controlling circuit 110. A revolution detection signal DFG is supplied from a drum motor 111 to the drum-motor driving/controlling circuit 110. Receiving the revolution detection signal DFG from the drum motor 111 and the switching signal HSW from the HSW shaping circuit 108, the above drum-motor driving/controlling circuit 110 drives and controls the drum motor 111 such that the rotary drum 102 rotates at 4000 rpm two times that of conventional DATs.

The reproduced signal PBS outputted from a playback amplifier 105 is supplied to the above tracking control circuit 109. The tracking control circuit 109 outputs a tracking-error signal TE on the basis of the reproduced signal PBS from the playback amplifier 105 and the switching signal HSW from the HSW shaping circuit 108. The tracking-error signal TE output from the tracking control circuit 109 is delivered through an adder circuit 112 to a capstan-motor driving circuit 113, which drives the capstan motor 114 to rotate at a constant revolution rate, thereby driving a capstan shaft 115 at a certain revolution rate. Inside the capstan motor 114, there is provided a revolution-number detection section which detects the revolution-number of the capstan shaft 115. The revolution-number detection section outputs a capstan revolution signal CFG to a speed comparator circuit 116. The speed comparator circuit 116 compares an actual tape speed obtained from the capstan revolution signal CFG and the tape speed specified in the DAT standard, thereby detecting errors therebetween. The error signal is supplied through the adder circuit 112 to the capstan-motor driving circuit 113, which controls the revolution rate of the capstan motor 114 on the basis of the error signal from the speed comparator circuit 116 and the tracking error signal TE from the tracking control circuit 109.

Figure 14:
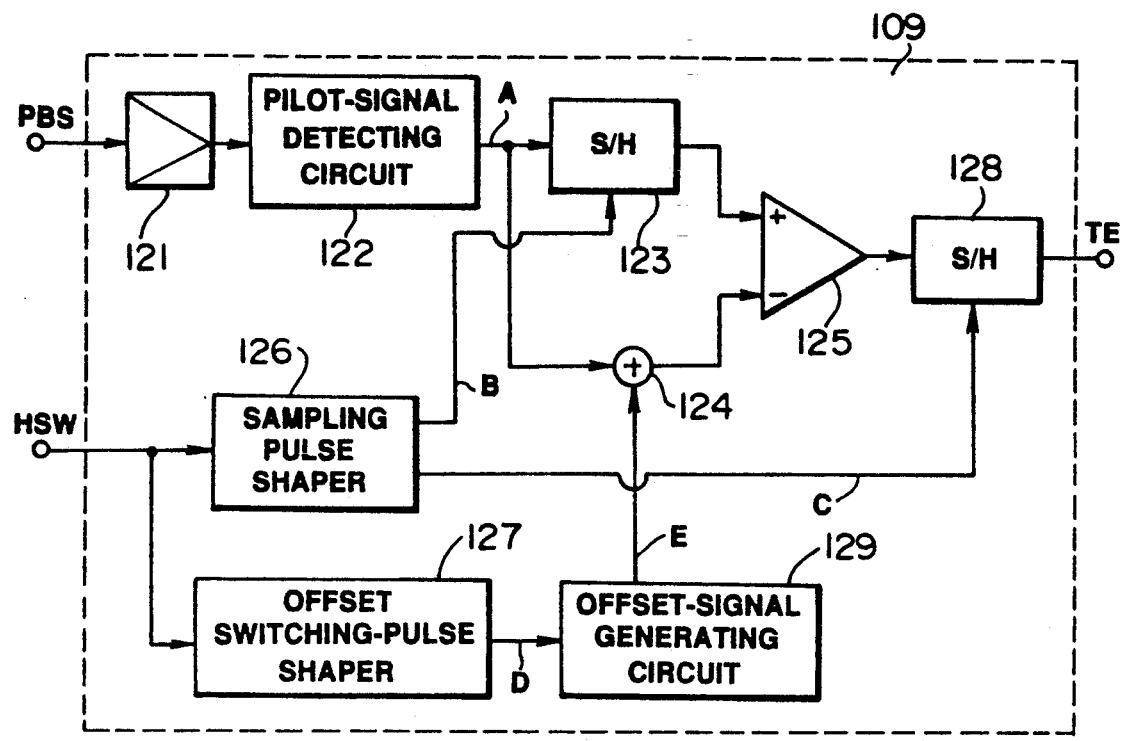

Now, the tracking control circuit 109 will be described in detail referring to FIG. 14. The reproduced signal PBS delivered from the playback amplifier 105 to the tracking control circuit 109 is amplified by an amplifier 121 and supplied to a pilot-signal detecting circuit 122. The pilot-signal detecting circuit 122 detects an envelope waveform of the pilot signal and supplies the waveform signal A to a sampling-hold circuit 123 and also to a negative terminal of a differential amplified 125 through the adder circuit 124.

On the other hand, the switching signal HSW delivered from the HSW shaping circuit 108 is supplied to a sampling-pulse shaping circuit 126 and an offset switching-pulse shaping circuit 127. The sampling-pulse shaping circuit 126 forms sampling-hold pulses B and C for sampling pilot signals of adjacent recording tracks, and supplies the sampling-hold pulse B to the sampling-hold circuit 123 and the sampling-hold pulse C to the sampling-hold circuit 128. The offset switching-pulse shaping circuit 127 forms offset switching-pulse D having a period of a half period of the switching signal HSW and supplies the pulse D to an offset-signal generating circuit 129. The offset-signal generating circuit 129 generates an offset signal E for controlling the magnetic head so as to trace the recording tracks, maintaining a predetermined relation with said recording tracks and supplies the offset signal E to the negative terminal of the differential amplifier 125 through the adder circuit 124. The above sampling-hold circuit 123 sampling-holds the output signal A of the pilot-signal shaping circuit 126 in synchronism with the sampling-hold pulse B delivered from the sampling-pulse shaping circuit 126, and inputs the above output signal A to the positive terminal of the differential amplifier 125. The output signal of the differential amplifier 125 is delivered to the sampling-hold circuit 128. The sampling-hold circuit 128 sampling-holds the output signal of the differential amplifier 125 in synchronism with the sampling-hold pulse C delivered from the sampling-pulse shaping circuit 126 and outputs the above output signal as the tracking error signal TE.

Figure 15:
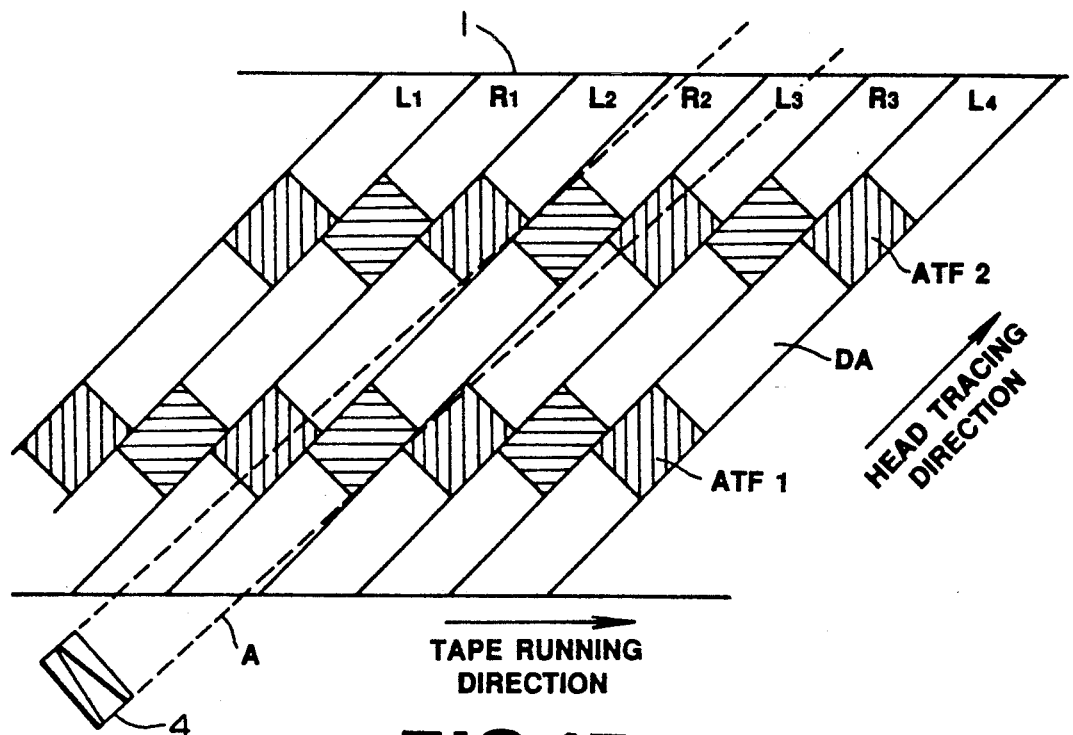

Now, the operation of the above embodiment will be described. On the magnetic tape 101, there are alternatively formed recording tracks L1, L2, ... and R1, R2, .... The recording tracks L1, L2, ... and the recording tracks R1, R2 have a different azimuth angle, respectively as shown in FIG. 15. The recording tracks L1, L2, ... and R1, R2, ..., each have areas ATF1 and ATF2 for tracking signals including pilot signals at both sides of the data-recording area DA, as shown in FIG. 15. The above magnetic tape 101 is driven at a constant speed by the capstan-motor driving circuit 113 and the capstan motor 114 and the recording tracks L1, L2, ... and R1, R2, ... are traced by the magnetic head 104, respectively. In this case, since the magnetic head 104 is driven by the drum-motor driving and control circuit 110 and the drum motor 111 to rotate at a rotating speed 4000 rpm two times that of conventional DATs, the tracing angle of the magnetic head is smaller than the angle of the recording tracks L1 ... R1, but the tracking control circuit 109 controls the magnetic head to trace the magnetic tape at position shown by broken lines A in FIG. 15. That is, tracing by the magnetic head is controlled such that its tracing position at the starting portion of the recording track is shifted a little towards the following track and its tracing position at the ending portion of the recording track is shifted a little towards the previous track, and its tracing position at central portion coincides with the recording track. The tracking control mentioned above allows to precisely reproduce data at the portion of the recording track other than its starting and ending portions. Even at the starting and ending portions of the recording track, the error correction function of DAT also allows to reproduce data with a sufficient level not to cause any practical trouble.

Hereinafter, the control operation of the above tracking control circuit 109 will be described referring to timing charts of FIGS. 16A through 16G. The tracking control circuit 109 illustrated in detail in FIG. 14 receives the reproduced signal PBS from the playback amplifier 121 and delivers said signal PBS to the pilot-signal detecting circuit 122 through the amplifier 121. The pilot-signal detecting circuit 122 detects pilot signals from the reproduced signal as shown at A in FIG. 16B and outputs the pilot signals to the sampling-hold circuit 23 and the adder circuit 124. If it is presumed that the magnetic head 104 is to trace the recording track R2 on the magnetic tape 101, the pilot-signal detecting circuit 122 sequentially detects the pilot signal $P_{R2}$ of the recording track R2, the pilot signal $P_{L2}$ of the following recording track L2 and the pilot signal $P_{L3}$ of the previous recording track L3, when the pilot signal has been detected from the area ATF1. At this time, since the magnetic head 104 tracing the recording track R2 is a little shifted in its tracing position towards the recording track L2, the pilot signal detected by the pilot signal detecting circuit 122 may include the signal $P_{R2}$ of the recording track R2 having a maximum level, the signal $P_{L2}$ of the following recording track L2 having a medium level and the signal $P_{L3}$ of the previous recording track L3 having a minimum level. When the pilot signal is reproduced from the area of ATF2 by the magnetic head 104, the magnetic head tracing the recording track R2 is a little shifted in its tracing position towards the recording track L3. Accordingly, the level of the pilot signal $P_{L2}$ of the recording track L2 becomes small, while the level of the pilot signal $P_{L3}$ of the previous recording track L3 becomes larger than that of the above signal $P_{L2}$.

On the other hand, the switching signal HSW delivered from the HSW shaping circuit 108 to the tracking control circuit 109 is supplied to the sampling-pulse shaping circuit 126 and the offset switching-pulse shaping circuit 127. As shown in FIGS. 16C and 16D, the sampling-pulse shaping circuit 126 forms sampling-hold pulses B at timing when the pilot-signal detecting circuit 122 outputs the pilot signal $P_{L2}$ and also forms sampling-hold pulses C at timing when the pilot signal $P_{L3}$ is output. These sampling-hold pulses B and C are output to the sampling-hold circuits 123 and 128, respectively. The sampling-hold circuit 123 sampling-holds the pilot signal $P_{L2}$ output from the pilot-signal detecting circuit 122 in synchronism with the above sampling-hold pulses B and supplies the pilot signal $P_{L2}$ to the positive terminal of the differential amplifier 125. Receiving the switching signal HSW, the above offset switching-pulse shaping circuit 127 forms the offset switching pulses D having a period of a half period of the signal HSW and supplies the above offset switching-pulses D to the offset-signal generating circuit 129, as shown in FIG. 16E. As shown in FIG. 16F, the offset-signal generating circuit 129 generates offset signal E which inverts its polarity in synchronism with the offset switching pulse D. The offset-signal E maintains its level positive until the magnetic head 104 tracing the recording tracks L1, R1, . . . reaches their center portion and makes its level negative thereafter. The offset signal E is added to the pilot signal detected by the pilot-signal detecting circuit 122 at the adder circuit 124 and is supplied to the negative terminal of the differential amplifier 125. The differential amplifier 125 supplies to the sampling-hold circuit 128 a signal corresponding to the difference between the signals input to its positive and negative terminals. The sampling-hold circuit 128 sampling-holds the output signal of the differential amplifier 125 in synchronism with the sampling hold pulses C delivered from the sampling-pulse shaping circuit 126. Since the sampling hold pulses C are supplied to the sampling-hold circuit 128 in synchronism with the pilot signal $P_{L3}$, the sampling-hold circuit 128 sampling-holds the difference signal between the pilot signal $P_{L2}$ and phase-shifted pilot signal $P_{L3}$ and outputs the difference signal as the tracking error signal TE. Usually, the pilot signals $P_{L2}$ and $P_{L3}$ output from the pilot signal detecting circuit 122 are compared without receiving any modification and the tracking error signal TE is output so as to make the difference between the above pilot signals to be minimized. In the present embodiment, however, the pilot signal to be input to the negative terminal of the differential amplifier 125 is phase-shifted for a predetermined value by the offset signal E and the tracking error signal TE is generated on the basis of the above phase-shifted pilot signal. The tracking error signal TE is delivered to the capstan-motor driving circuit 113 through the adder circuit 112 together with the output signal of the speed comparator circuit 116 and thereby the capstan-motor 114 is driven such that the magnetic head 104 traces the recording track at the angle indicated by broken lines A in FIG. 15. In this case, the tracing angle by the magnetic head is determined in accordance with the level of the offset signal E output from the offset-signal generating circuit 129.

It will be understood from the above description that by maintaining the relationship indicated by the broken lines A in FIG. 15 between the recording tracks L1, . . . R1, . . . on the magnetic tape 101 and the tracing executed by the magnetic head 104, the reproducing operation by the double azimuth head 101 can be surely performed without changing the lead angle of the rotary drum 102.

What is claimed is:

1. A tracking control device in a magnetic reproducing apparatus wherein a plurality of record tracks including respective pilot signals formed on a magnetic tape at a predetermined lead angle to a tape longitudinal direction are traced by a magnetic head for reproducing a signal, said tracing control device comprising:

tape driving means for driving the magnetic tape at a predetermined running speed;

rotary head means carrying said magnetic head, for rotating said magnetic head to trace the plurality of record tracks on the magnetic tape driven by said tape driving means, said magnetic head including two gaps having different azimuth angles from each other and said respective gaps being adapted to be used to trace every other record track;

signal reproducing circuit mean coupled to said magnetic head, for reproducing a signal supplied from said magnetic head;

pilot signal detecting means coupled to said signal reproducing circuit means for detecting pilot signals included in the signal reproduced by said signal producing circuit means, the pilot signals being reproduced in record tracks on both sides of the record track which is traced by one of the gaps of said magnetic head, and for outputting pilot-signal direction signals each representing level of the detected pilot signals;

offset means for offsetting a level of only one of the pilot-signal detection signals output from said pilot signal detecting means by a predetermined value; and tape speed control means or controlling said tape driving means to adjust the tape running speed of the magnetic tape such that the offset level of one of the pilot-signal detection signals will coincide with the level of the other of the pilot-signal detection signals whereby said magnetic head of the rotary head means is allowed to trace the record tracks at a tracking angle which is different by a certain angle from the predetermined lead angle of the record tracks.

2. A tracking control device in a magnetic reproducing apparatus according to claim 1, wherein said offset means comprises:

an offset-signal generating circuit for generating an offset signal of a predetermined level; and superimposing means for superimposing the offset-signal generated by said offset-signal generating circuit on the pilot-signal detection signal output from said pilot signal detecting means.

3. A tracking control device in a magnetic reproducing apparatus according to claim 2, wherein said offset-signal generating circuit generates an offset-signal having a period of approximately half of a period in which said magnetic head traces a record track on the magnetic tape.

4. A tracking control device in a magnetic reproducing apparatus according to claim 1, wherein said offset means shifts a level of one of the pilot-signal detection signals by a predetermined value during approximately half of the period in which the magnetic head traces one record track on the magnetic tape.

5. A tracking control device in a magnetic reproducing apparatus according of claim 1, wherein information on the said record tracks on the magnetic tape includes digital data and said pilot signal detecting means detects the pilot signal in the record track.

6. A tracking control device in a magnetic reproducing apparatus wherein a plurality of record tracks including respective pilot signals formed on a magnetic tape at a lead angle $\theta$ to a tape longitudinal direction are traced by a reproducing magnetic head for reproducing a signal, the angle $\theta$ corresponding to an angle at which two recording magnetic heads of a separate dubbing machine driven at a rotating speed fv trace the magnetic tape to form the above record tracks thereon, said trace king control device comprising:

tape driving means for driving the magnetic tape with the recording tracks formed thereon at a predetermined tape running speed;

rotary drum means carrying said reproducing magnetic head which includes two gaps having different azimuth angels from each other, for rotating said reproducing magnetic head at a rotating speed of 2fv, which is two times the rotating speed fv of the recording magnetic heads of the separate dubbing machine;

reproducing circuit means coupled to said reproducing magnetic head for reproducing a signal supplied from the reproducing a magnetic head of said rotary drum means;

pilot signal detecting means coupled to said reproducing circuit means for detecting pilot signals included in the signal reproduced by said reproducing circuit means, said pilot signals being recorded in record tracks on both sides of the record track which is traced by one of the gaps included in said reproducing magnetic head, and for outputting pilot-signal detecting signals which represent levels of the detected pilot signals respectively;

offset means for offsetting a level of only one of the pilot-signal detection signals output from said pilot signal detecting means by a predetermined value; and tape speed control means for controlling said tape driving means to adjust the tape running speed of the magnetic tape such that the offset level of one of the pilot-signal detection signals will coincide with the level of the other of said pilot-signal detection signals, whereby the reproducing magnetic head of said rotary drum means is allowed to trace the record tracks at an angle which is different by a certain angle from the lead angle $\theta$.

* * * * *